United States Patent
Winterhalter et al.

(10) Patent No.: US 8,684,395 B2
(45) Date of Patent: Apr. 1, 2014

(54) CHILD STROLLER AND STAND PLATFORM ASSEMBLY THEREOF

(75) Inventors: Andrew J. Winterhalter, West Lawn, PA (US); Curtis M. Hartenstine, Birdsboro, PA (US); Joseph F. Fiore, Jr., Lebanon, PA (US); Lin-Hai Shan, Guangdong (CN)

(73) Assignee: Wonderland Nurserygoods Company Limited, Central (HK)

( * ) Notice: Subject to any disclaimer, the term of this patent is extended or adjusted under 35 U.S.C. 154(b) by 139 days.

(21) Appl. No.: 13/276,331

(22) Filed: Oct. 19, 2011

(65) Prior Publication Data

US 2012/0098237 A1 Apr. 26, 2012

Related U.S. Application Data

(60) Provisional application No. 61/455,565, filed on Oct. 21, 2010.

(30) Foreign Application Priority Data

Sep. 26, 2011 (CN) .......................... 2011 1 0288451

(51) Int. Cl.
*B62B 3/02* (2006.01)
*B62B 9/08* (2006.01)

(52) U.S. Cl.
CPC ..................................... *B62B 9/082* (2013.01)
USPC ....................................................... 280/647

(58) Field of Classification Search
CPC .......... B62B 9/082; B62B 9/28; B62B 5/087; B62B 2205/26
USPC ........ 280/647, 204, 650, 47.38, 47.4, 33.994; 188/20
See application file for complete search history.

(56) References Cited

U.S. PATENT DOCUMENTS

| 6,086,087 | A | | 7/2000 | Yang |
| 6,152,476 | A | * | 11/2000 | Huang .......................... 280/642 |
| 6,478,327 | B1 | | 11/2002 | Hartenstine |
| 6,666,473 | B2 | * | 12/2003 | Hartenstine et al. .......... 280/647 |
| 6,889,998 | B2 | * | 5/2005 | Sterns et al. ................... 280/651 |
| 2001/0013688 | A1 | * | 8/2001 | Warner et al. .............. 280/47.38 |
| 2002/0067026 | A1 | * | 6/2002 | Hsia .............................. 280/647 |
| 2002/0195299 | A1 | | 12/2002 | Cheng |
| 2003/0057681 | A1 | * | 3/2003 | Lan ............................... 280/642 |
| 2004/0222605 | A1 | | 11/2004 | Sterns |
| 2006/0226635 | A1 | * | 10/2006 | Huang .......................... 280/642 |

(Continued)

FOREIGN PATENT DOCUMENTS

| CN | 1275507 A | 12/2000 |
| CN | 2466019 Y | 12/2001 |
| CN | 2505362 Y | 8/2002 |

(Continued)

*Primary Examiner* — J. Allen Shriver, II
*Assistant Examiner* — Brian Cassidy
(74) *Attorney, Agent, or Firm* — Winston Hsu; Scott Margo

(57) ABSTRACT

A child stroller and a stand platform assembly thereof are disclosed. The child stroller includes a frame, a brake assembly connected to the frame, two rear wheels connected to the brake assembly, and the stand platform assembly. The stand platform assembly includes a platform connected to a rear cross bar of the frame, and two sidewalls connected to two opposite sides of the platform. When the child stroller is folded, the folded child stroller is capable of being supported by the sidewalls and the rear wheels, which solves the inconvenience in placing a folded conventional stroller.

16 Claims, 12 Drawing Sheets

(56) References Cited

U.S. PATENT DOCUMENTS

2008/0088115 A1    4/2008   Yang
2010/0187786 A1*   7/2010   van Petegem et al. ..... 280/47.38
2010/0282800 A1    11/2010  Li
2013/0234419 A1*   9/2013   Yang et al. .................... 280/650

FOREIGN PATENT DOCUMENTS

| CN | 101411572 A | 4/2009 |
| GB | 2479033 A | 9/2011 |
| TW | M311628 | 5/2007 |
| WO | 9916653 A1 | 4/1999 |

* cited by examiner

CHILD STROLLER AND STAND PLATFORM ASSEMBLY THEREOF

CROSS REFERENCE TO RELATED APPLICATIONS

This application claims the benefit of U.S. Provisional Application No. 61/455,565, which was filed on Oct. 21, 2010 and is incorporated herein by reference.

BACKGROUND OF THE INVENTION

1. Field of the Invention

The invention relates to a child stroller and a stand platform assembly thereof, and especially relates to a stand platform assembly installed in the rear of a child stroller and a child stroller with the stand platform assembly.

2. Description of the Prior Art

A current tandem stroller includes a front seat, a rear bench seat, and a rear stand platform. In the design of the tandem stroller, the issue is that many strollers of such design do not have the ability to stand alone when folded because of the existence of the rear stand platform at the rear of the stroller. It is an important feature for a stroller to be capable of standing when folded in the stroller market, or a user needs more time or an additional device to hold the stroller leading to inconvenience of the user. In addition, the rear stand platform is usually fixed, so when the stroller moves cross a curb or step, the rear stand platform easily hits the curb or step leading to harm of the rear stand platform.

SUMMARY OF THE INVENTION

An objective of the invention is to provide a stand platform assembly installed in a child stroller. The child stroller can stand by the stand platform assembly together with rear wheels of the child stroller when the child stroller is folded.

The stand platform assembly of the invention is installed in a child stroller. The child stroller includes a frame, a brake assembly, and two rear wheels connected to the brake assembly. The frame includes two rear legs and a rear cross bar connected to the two rear legs. The brake assembly is connected to the two rear legs. The stand platform assembly includes a platform and two sidewalls. The platform is connected to the rear cross bar. The sidewalls are connected to two opposite sides of the platform. When the child stroller is folded, the folded child stroller is capable of being supported by the sidewalls and the rear wheels. Thereby, the folded child stroller can stand alone without any auxiliary device. In addition, the sidewalls can be designed to be engaged with the brake assembly in a detachable way, so that the stand platform assembly can be rotated upward about the rear cross bar to prevent being harmed when hitting an object.

Another objective of the invention is to provide a child stroller, having the stand platform assembly of the invention. Similarly, the child stroller can stand alone when folded.

The child stroller of the invention includes a frame, a brake assembly, two rear wheels, and a stand platform assembly. The frame includes two rear legs and a rear cross bar connected to the two rear legs. The brake assembly is connected to the two rear legs. The two rear wheels are connected to the brake assembly. The stand platform assembly includes a platform and two sidewalls. The platform is connected to the rear cross bar. The sidewalls are connected to two opposite sides of the platform. When the child stroller is folded, the folded child stroller is capable of being supported by the sidewalls and the rear wheels. Thereby, the folded child stroller can stand alone without any auxiliary device. Similarly, if the sidewalls are engaged with the brake assembly in a detachable way, the stand platform assembly can be rotated upward about the rear cross bar to prevent being harmed when hitting an object.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
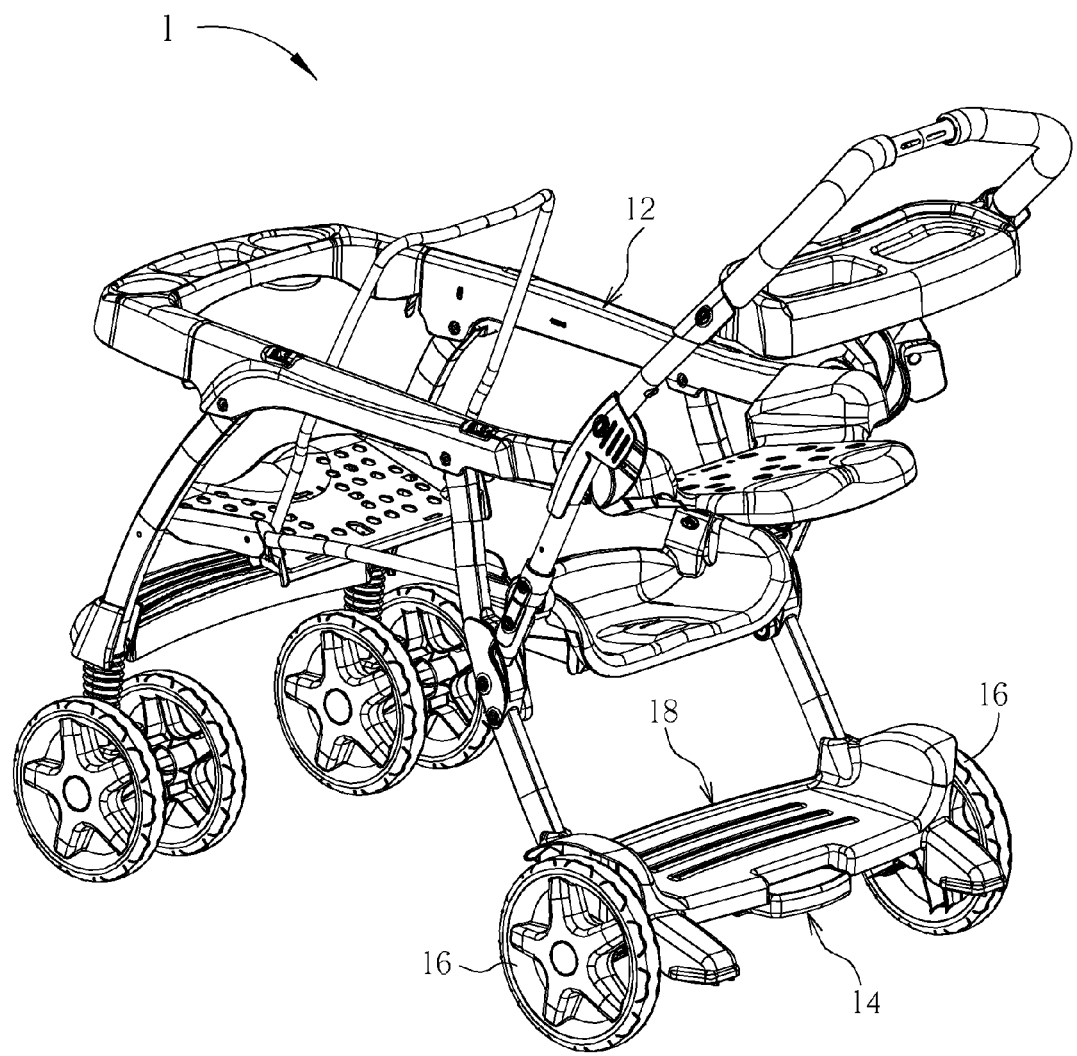
FIG. 1 is a schematic diagram illustrating a child stroller of a preferred embodiment according to the invention.
Figure 2:
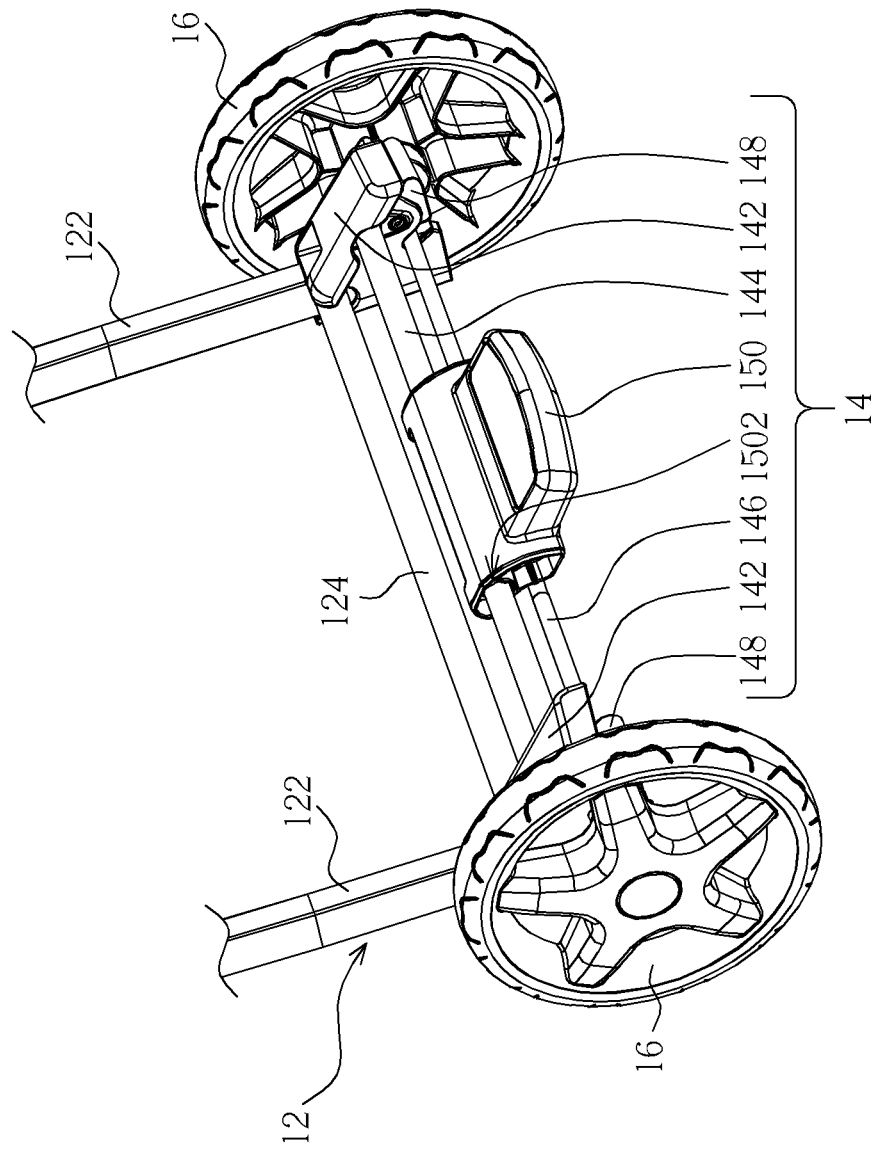
FIG. 2 is a schematic diagram illustrating the configuration of a part of a frame, a brake assembly, and rear wheels of the child stroller in FIG. 1.

Please refer to FIG. 1, which is a schematic diagram illustrating a child stroller 1 of a preferred embodiment according to the invention. The child stroller 1 includes a frame 12, a brake assembly 14, two rear wheels 16, and a stand platform assembly 18. Please also refer to FIG. 2 for the whole view of the brake assembly 14; FIG. 2 is a schematic diagram illustrating the configuration of a part of the frame 12, the brake assembly 14, and the rear wheels 16 of the child stroller 1. The frame 12 includes two rear legs 122 and a rear cross bar 124 connected to the two rear legs 122. The brake assembly 14 is connected to the two rear legs 122. The two rear wheels 16 are connected to the brake assembly 14 oppositely. The stand platform assembly 18 is disposed upon the brake assembly 14 and the rear cross bar 124.

Figure 3:
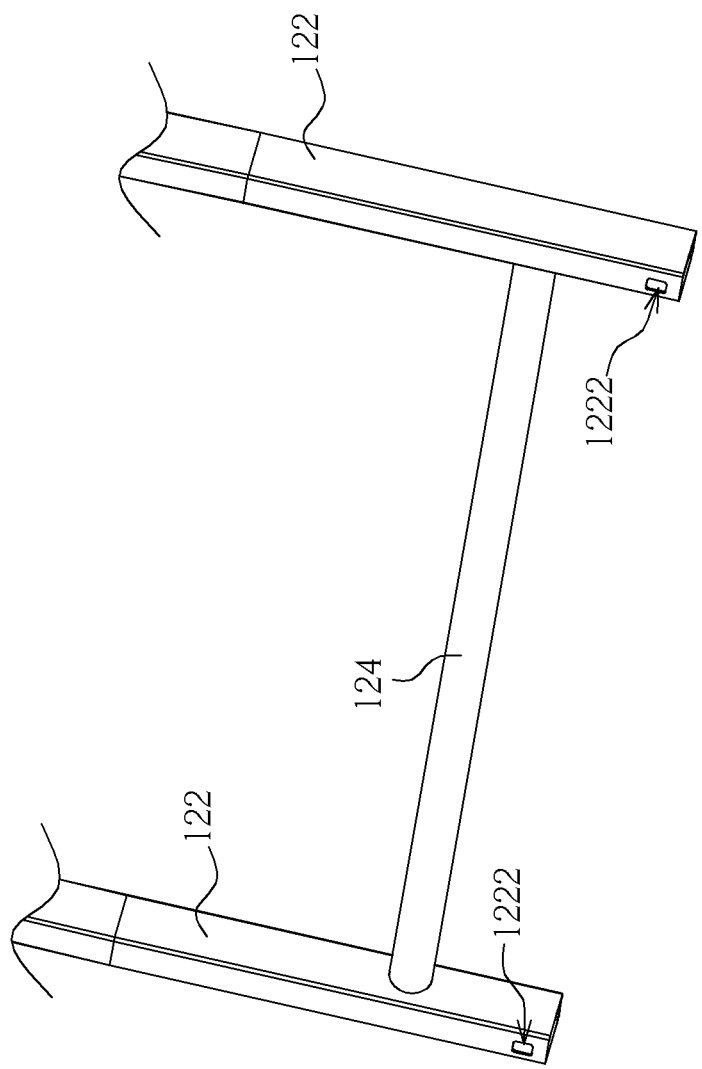
FIGS. 3 through 6 are schematic diagrams illustrating the assembly of the brake assembly, a stand platform assembly, and the wheels onto the frame.

For the detail of the assembly of the brake assembly 14, the rear wheels 16, and the stand platform assembly 18, please refer to FIGS. 3 through 6. As shown in FIG. 3, at first, the two rear legs 122 are prepared with the rear cross bar 124 welded thereto.

Figure 4:
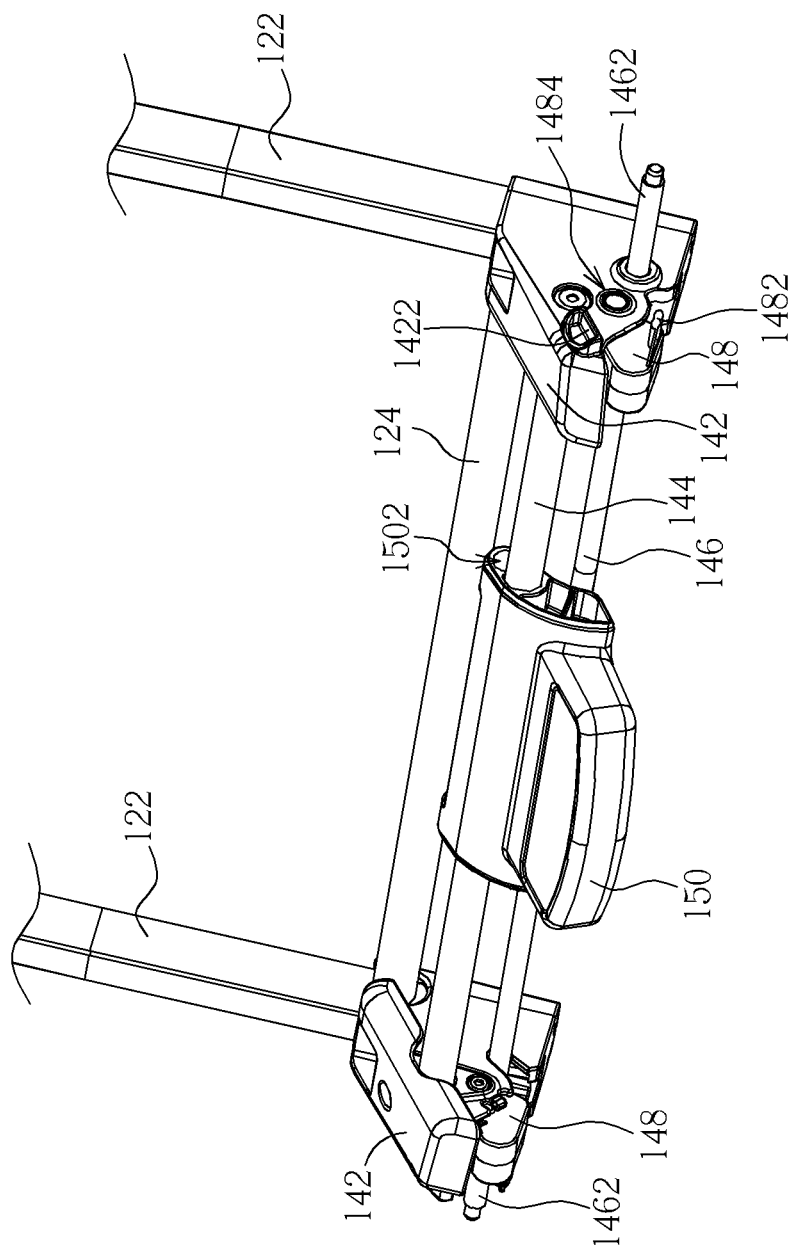

The brake assembly 14 includes two brake housings 142, a cross member 144, a driven axle 146, two brake engagers 148, and a pedal 150. The cross member 144 is connected to the two brake housings 142. The driven axle 146 passes through the two brake housings 142 and is pivotally connected thereto. The two brake engagers 148 are disposed in and pivotally connected to the two brake housings 142 respectively. The two end portions of the driven axle 146 are connected to the brake engagers 148 for driving the brake engagers 148 simultaneously. The pedal 150 is mounted on the driven axle 146 and has a through slot 1502. The cross member 144 passes through the through slot 1502. In this embodiment, the driven axle 146 extends out the brake housings 142 to form wheel axles 1462 for the rear wheels 16; however, the invention is not limited to it. The pedal 150 is capable of being stepped down to drive the brake engagers 148 simultaneously through the driven axle 146. Therefore, a user can use just a foot to brake the two rear wheels 16 simultaneously for enhancing the braking stability. The detail of the brake mechanism will be described later. In the embodiment, the brake assembly 14 is mounted on the rear legs 122 by sliding the brake housings 142 up on the rear legs 122 until the brake housings 142 snap into the holes 1222 (shown in FIG. 3) formed on the rear legs 122 respectively, as shown in FIG. 4. In practice, the connection between the brake assembly 14 and the frame 12 can be realized in other ways, for example by screws.

Figure 5:
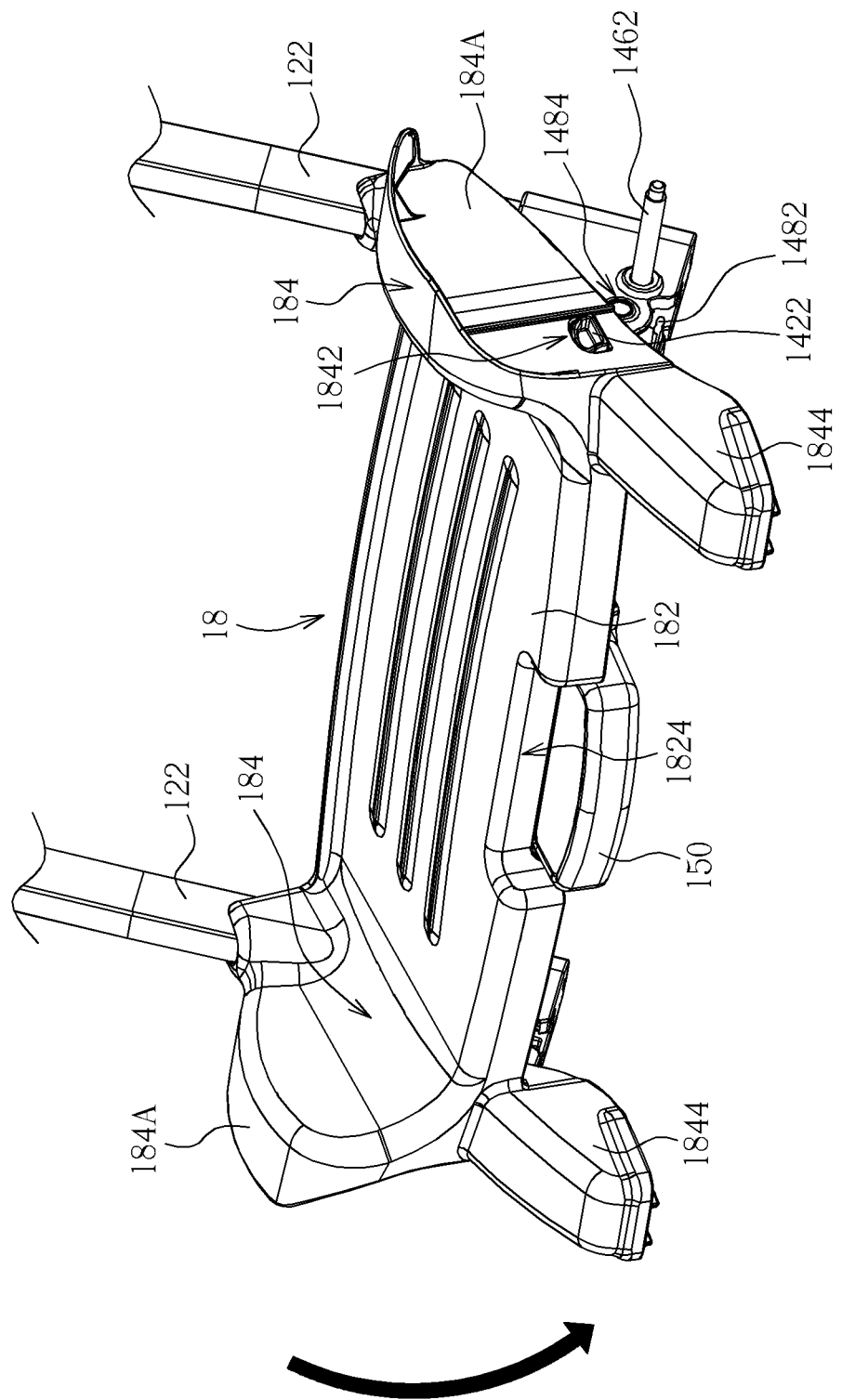
Figure 9:
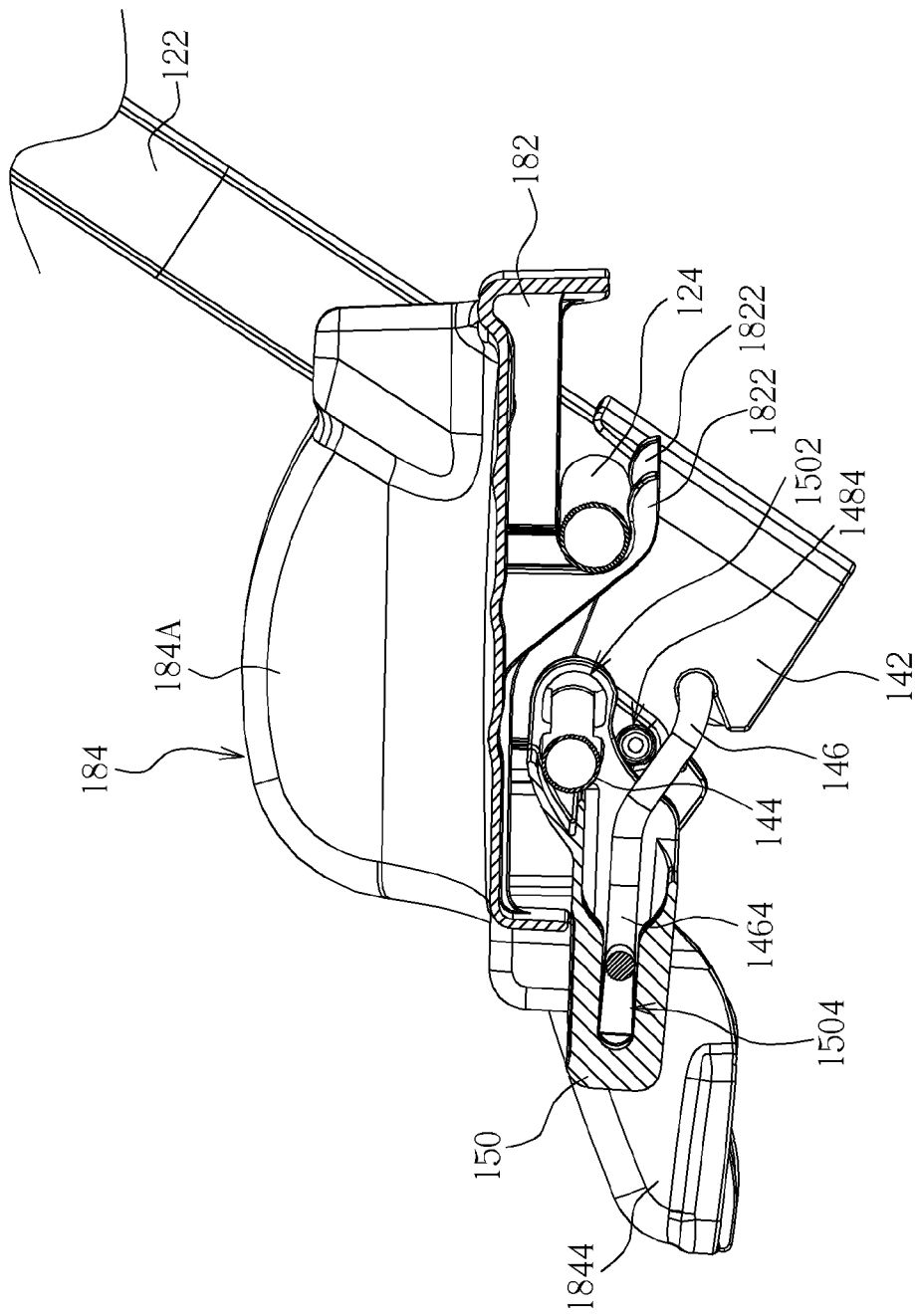
FIG. 9 is a sectional view of the brake assembly together with the stand platform assembly.

The stand platform assembly 18 includes a platform 182 and two sidewalls 184 connected to two opposite sides of the platform 182. The platform 182 includes a snap structure 1822 (referring to FIG. 9) and is pivotally connected to the rear cross bar 124 by the snap structure 1822 snapping onto the rear cross bar 124. Each sidewall 184 includes a fender 184A engaged with the brake assembly 14 in a detachable way. As shown in FIG. 5, in the embodiment, the fender 184A has a hole 1842, while the brake housing 142 of the brake assembly 14 has a boss 1422. When the platform 182 has snapped onto the rear cross bar 124, the stand platform assembly 18 can be rotated downward (indicated by an arrow in FIG. 5) until the fenders 184A are engaged with the brake housings 142; therein, the boss 1422 snaps into the hole 1842. It is added that the engagement of the boss 1422 and the hole 1842 is detachable, which is conducive to the assembly of the child stroller 1. Further, when one of the sidewalls 184 or the platform 182 hits an object such as a curb or step, for example by its foot 1844, the fenders 184A are capable of being disengaged from the brake housings 142 so that the stand platform assembly 18 can rotate upward about the rear cross bar 124 to prevent being harmed. Once the fenders 184A are disengaged from the brake housings 142, the stand platform assembly 18 can be rotated downward for engaging with the brake housings 142 again. Furthermore, in the embodiment, the pedal 150 is disposed between the rear wheels 16, so the platform 182 has a release recess 1824 at an edge thereof for exposing the pedal 150. It is added that the stand platform assembly 18 can be but not limited to a plastic injection molded part.

Figure 6:
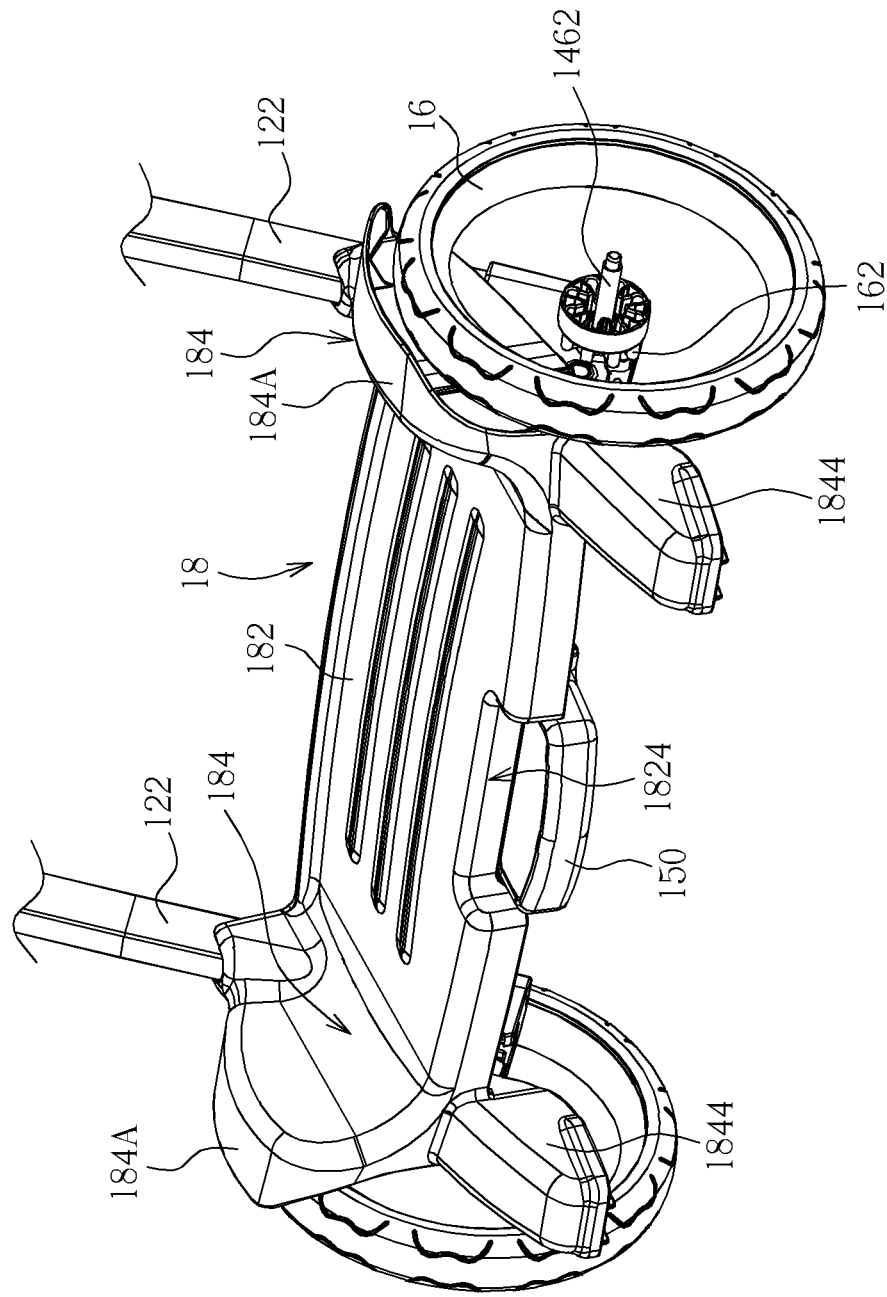

As shown in FIG. 6, the rear wheels 16 are then attached to the axles 1462 of the brake assembly 14. For clear illustration of the engagement of the wheel 16 and the axles 1462, the spokes of the wheel 16 are not shown in FIG. 6.

Figure 7:
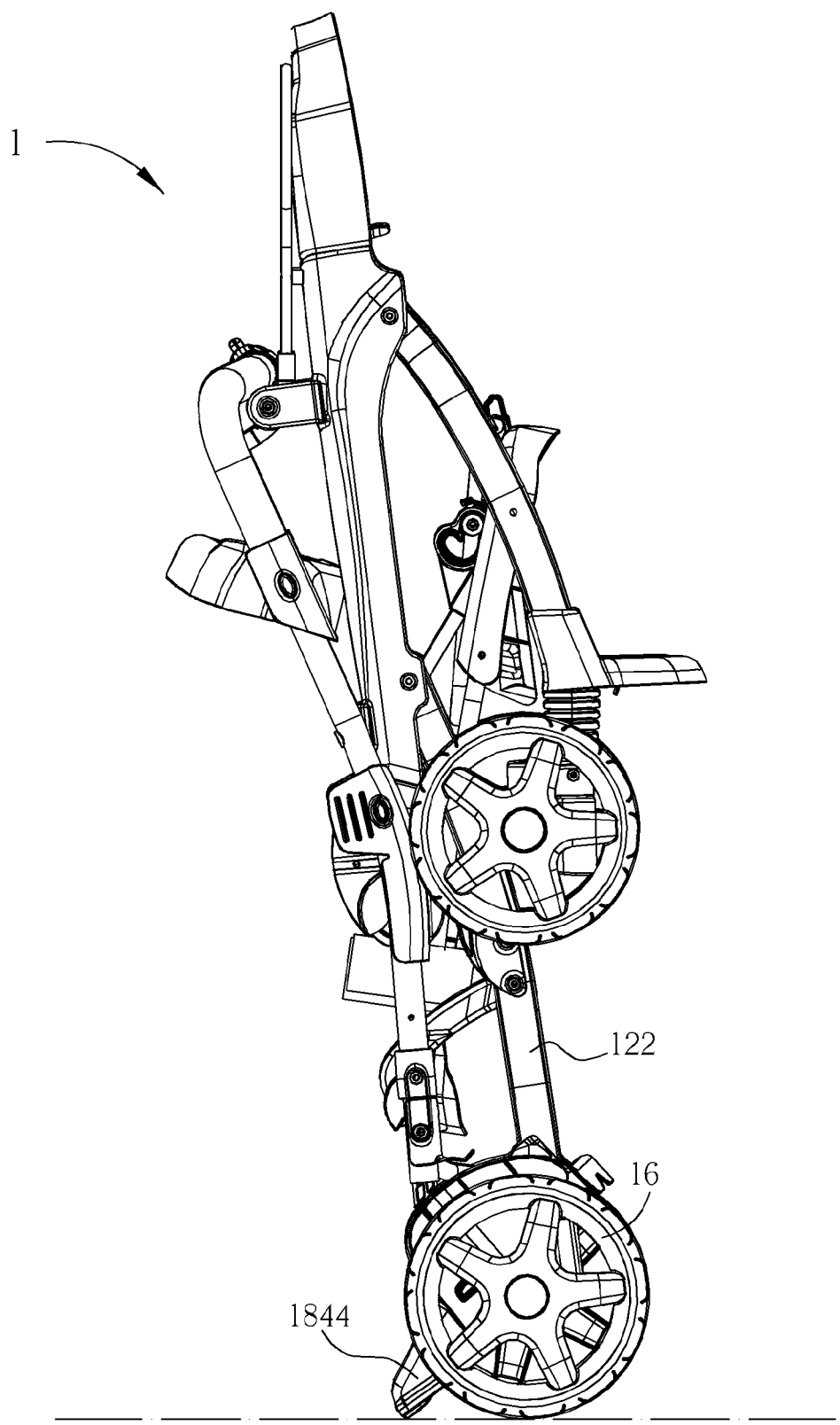
FIG. 7 is a schematic diagram illustrating the folded child stroller in FIG. 1.

Please refer to FIG. 7, which is a schematic diagram illustrating the folded child stroller 1. In the embodiment, when the child stroller 1 is folded, the folded child stroller 1 is capable of being supported by the feet 1844 of the sidewalls 184 and the rear wheels 16. That is, a user can easily and quickly place the folded child stroller 1 alone on the ground (shown by a chain line). It solves the inconvenience in placing a folded conventional stroller.

Figure 8:
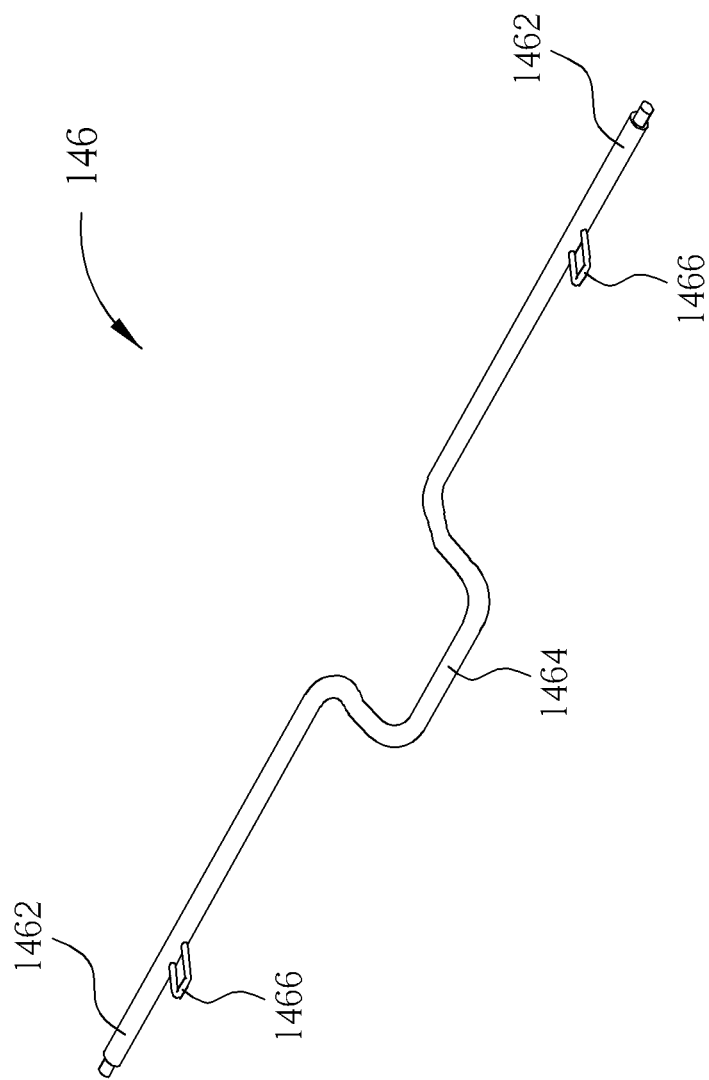
FIG. 8 is a schematic diagram illustrating a driven axle of the brake assembly.

For the brake mechanism of the brake assembly 14, please refer to FIG. 8 first. FIG. 8 is a schematic diagram illustrating the driven axle 146, which includes a larger U-shaped tab 1464 at its center portion and two smaller U-shaped tabs 1466 at its two end portions respectively. In the embodiment, the driven axle 146 is mainly formed by a metal rod (or a metal tube in practice). The U-shaped tab 1464 is formed by bending the center portion of the metal rod; the U-shaped tabs 1466 are formed by welding additional parts onto the metal rod. Please also refer to FIG. 9, which is a sectional view of the brake assembly 14 together with the stand platform assembly 18. The pedal 150 has a sheath 1504 and is mounted on the driven axle 146 by inserting the U-shaped tab 1464 into the sheath 1504. Similarly, the driven axle 146 is connected to the brake engagers 148 by inserting the U-shaped tabs 1466 into the brake engagers 148; it is no longer shown by drawings in particular. It is added that, in the embodiment, the brake engager 148 is also pivotally connected to the brake housing 142 at axis 1484 for performing braking function more stably; however, the invention is not limited to it.

Figure 10:
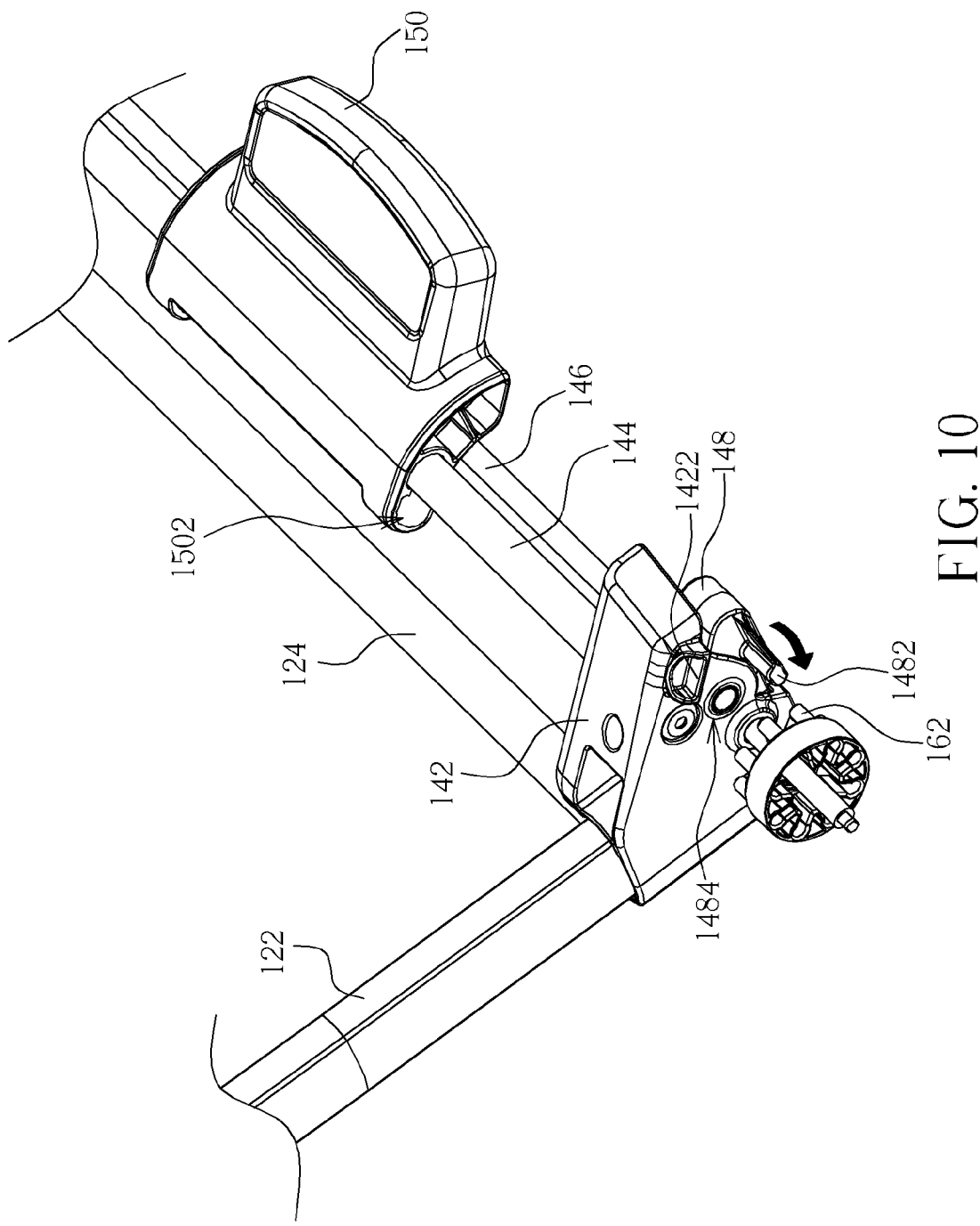
FIG. 10 is a schematic diagram illustrating the configuration of a brake engager of the brake assembly and the hub of the wheel.
Figure 11:
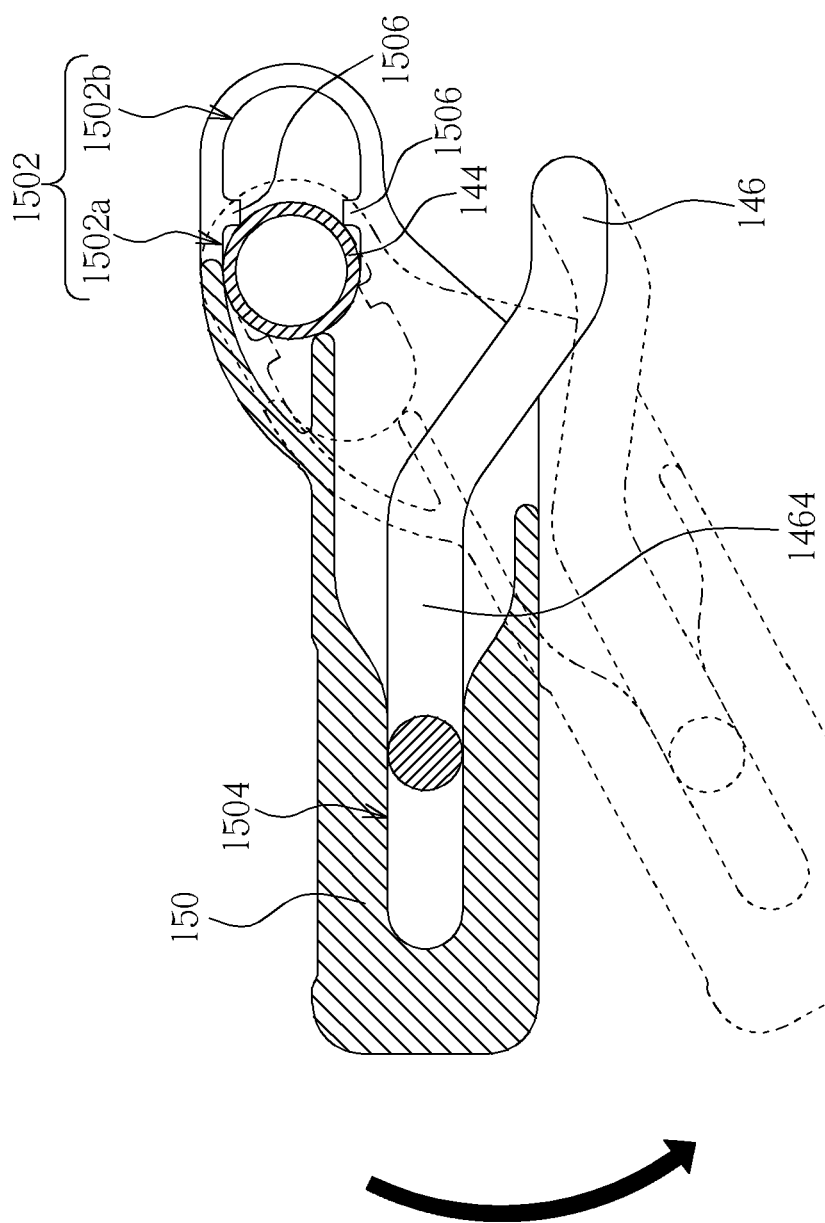
FIG. 11 is a sectional view mainly of a pedal of the brake assembly for illustrating an engagement position and a disengagement position for the pedal.

Please refer to FIG. 10, which is a schematic diagram illustrating the configuration of the brake engager 148 of the brake assembly 14 and the hub of the wheel 16. The wheel 16 includes a cog extender 162. The brake engager 148 is capable of being rotated downward (indicated by an arrow in FIG. 10) to wedge a boss 1482 in between the bosses on the cog extender 162. Please also refer to FIG. 11, which is a sectional view mainly of the pedal 150 for illustrating an engagement position and a disengagement position for the pedal 150. The pedal 150 has two detents 1506 oppositely formed in the through slot 1502 to form two passages 1502a and 1502b corresponding to the disengagement position and the engagement position respectively. However, the invention is not limited to it; the quantity of the detents can be increased to enhance the structural strength. When the pedal 150 stays in the disengagement position (shown in solid lines), the cross member 144 passes through the passage 1502a and the brake engagers 148 are disengaged from the cog extenders 162. When the pedal 150 is moved downward (indicated by an arrow in FIG. 11) to stay in the engagement position (shown in dashed lines), the through slot 1502 moves such that the cross member 144 passes through the passage 1502b, and the driven axle 146 is therefore rotated to drive the brake engagers 148 to engage with the cog extenders 162 by wedging the boss 1482 in between the bosses on the cog extender 162 for braking the rear wheels 16. In other words, by use of the detents 1506 constraining the cross member 144, the pedal 150 can selectively stay in the engagement position or the disengagement position. Afterward, the pedal 150 can be moved upward to be stay in the disengagement position again. It is added that, in practice, the position maintenance for the pedal 150 can be realized in other ways, for example by friction between the cross member 144 and the through slot 1502.

Figure 12:
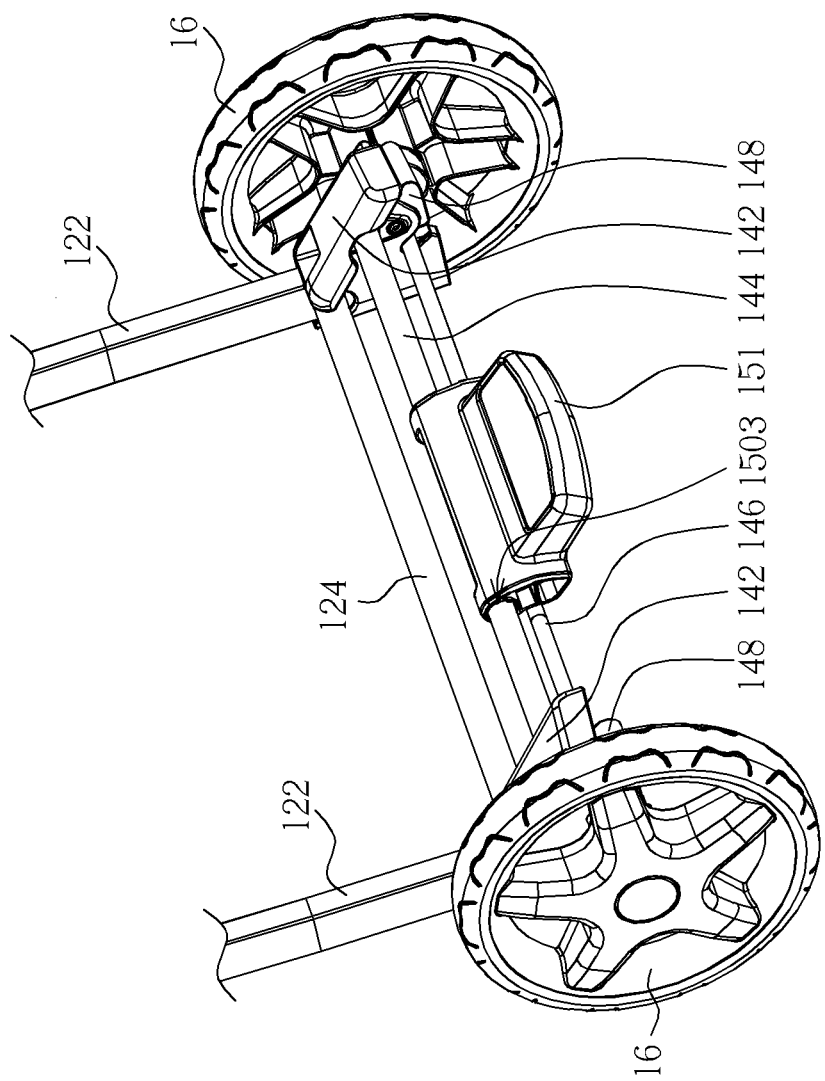
FIG. 12 is a schematic diagram illustrating the configuration of a part of a frame, a brake assembly, and rear wheels of the child stroller according to another embodiment.

The above embodiment is based on the fact that the through slot 1502 forms the two passages 1502a and 1502b; however, the invention is not limited to it. Please refer to FIG. 12. The through slot 1503 of the pedal 151 has only one passage for the cross member 144 to pass through, so as to enhance the fixing strength of the pedal 151. The through slot 1503 can be formed with several detents by request, so as to reduce the rotation friction of the pedal 151 and to enhance the structural rigidity.

As discussed above, the child stroller having the stand platform assembly according to the invention can stand alone by the sidewalls and the rear wheels without any auxiliary device. Furthermore, by the design of detachable engagement between the sidewalls and the brake assembly, the stand platform assembly is capable of being rotated about the rear cross bar to prevent being harmed when hitting an object.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A stand platform assembly installed in a child stroller, the child stroller comprising a frame, a brake assembly, and two rear wheels connected to the brake assembly, the frame comprising two rear legs and a rear cross bar connected to the two rear legs, the brake assembly being connected to the two rear legs, the stand platform assembly comprising:
   a platform, connected to the rear cross bar;
   two sidewalls, connected to two opposite sides of the platform; and
   two fenders, each fender being connected to a corresponding sidewall, and the two fenders being disposed upon the brake assembly, wherein the platform, the two sidewalls, and the two fenders are integrally formed;
   wherein when the child stroller is folded, the folded child stroller is capable of being supported by the sidewalls and the rear wheels.

2. The stand platform assembly of claim 1, wherein the platform is pivotally connected to the rear cross bar such that the platform and the sidewalls are capable of being rotated about the rear cross bar when one of the sidewalls hits an object.

3. The stand platform assembly of claim 2, wherein the platform comprises a snap structure and is pivotally connected to the rear cross bar by the snap structure snapping onto the rear cross bar.

4. The stand platform assembly of claim 1, wherein the fenders are engaged with the brake assembly in a detachable way.

5. The stand platform assembly of claim 4, wherein the fender has a hole, the brake assembly has a boss, and when the fender is engaged with the brake assembly, the boss snaps into the hole.

6. The stand platform assembly of claim 1, the brake assembly comprising a pedal disposed between the rear wheels, wherein the platform has a release recess at an edge thereof for exposing the pedal.

7. A child stroller, comprising:
   a frame, comprising two rear legs and a rear cross bar connected to the two rear legs;
   a brake assembly, connected to the two rear legs;
   two rear wheels, connected to the brake assembly; and
   a stand platform assembly, comprising:
      a platform, connected to the rear cross bar;
      two sidewalls, connected to two opposite sides of the platform; and
      two fenders, each fender being connected to a corresponding sidewall, and the two fenders being detachably disposed upon the brake assembly, wherein the platform, the two sidewalls, and the two fenders are integrally formed;
   wherein when the child stroller is folded, the folded child stroller is capable of being supported by the sidewalls and the rear wheels.

8. The child stroller of claim 7, wherein the platform is pivotally connected to the rear cross bar such that the platform and the sidewalls are capable of being rotated about the rear cross bar when one of the sidewalls hits an object.

9. The child stroller of claim 8, wherein the platform comprises a snap structure and is pivotally connected to the rear cross bar by the snap structure snapping onto the rear cross bar.

10. The child stroller of claim 7, wherein the fender has a hole, the brake assembly has a boss, and when the fender is engaged with the brake assembly, the boss snaps into the hole.

11. The child stroller of claim 7, wherein the brake assembly comprises a pedal disposed between the rear wheels, and the platform has a release recess at an edge thereof for exposing the pedal.

12. The child stroller of claim 11, wherein the brake assembly comprises two brake housings mounted on the two rear legs respectively, a cross member connected to the two brake housings, a driven axle pivotally connected to the two brake housings, and two brake engagers disposed in the two brake housings respectively for braking the rear wheels, and two end portions of the driven axle are connected to the brake engagers for driving the brake engagers simultaneously.

13. The child stroller of claim 12, wherein the pedal is mounted on the driven axle and has a through slot, and the cross member passes through the through slot.

14. The child stroller of claim 13, wherein the pedal has a detent formed in the through slot to form two passages for the pedal to selectively constrain the cross member in one of the two passages.

15. The child stroller of claim 12, wherein the driven axle comprises a U-shaped tab, the pedal has a sheath, and the pedal is mounted on the driven axle by inserting the U-shaped tab into the sheath.

16. The child stroller of claim 12, wherein the driven axle comprises two U-shaped tabs at the two end portions respectively, and the driven axle is connected to the brake engagers by the U-shaped tabs.

* * * * *